(No Model.)

H. H. HOBART & E. T. COOMBES.
CHECK REIN HOOK.

No. 326,217.  Patented Sept. 15, 1885.

WITNESSES
C. M. Dashiell
Ohn N. Moore

INVENTORS
H. H. Hobart.
Edwin T. Coombes
By, C. A. Snow & Co.
Attorneys

UNITED STATES PATENT OFFICE.

HENRY H. HOBART AND EDWIN T. COOMBES, OF WESTFIELD, PA.

CHECK-REIN HOOK.

SPECIFICATION forming part of Letters Patent No. 326,217, dated September 15, 1885.

Application filed June 24, 1885. (No model.)

*To all whom it may concern:*

Be it known that we, HENRY H. HOBART and EDWIN T. COOMBES, citizens of the United States, residing at Westfield, in the county of Tioga and State of Pennsylvania, have invented a new and useful Improvement in Check-Rein Hooks, of which the following is a specification, reference being had to the accompanying drawings.

Our invention relates to check-rein hooks, the object being to provide a device of this character whereby a horse may be unchecked to enable him to drink, and rechecked without the necessity of the driver alighting from the vehicle.

A further object of the invention is to provide a check-rein hook which shall be simple in its construction, effective in its operation, and one that may be manufactured and supplied at a slight cost.

With these ends in view the invention consists in the combination, with a hook, of a pivoted lever carrying a loop having an eye through which a cord connected with the check-rein is adapted to pass, whereby said cord may be pulled to remove the check-rein from engagement with the hook and cause it to engage the lever, so that when the horse lowers his head the check-rein will be drawn forward.

The invention further consists in the improved construction and combinations of parts, hereinafter fully described, and pointed out in the claims.

Figure 1:
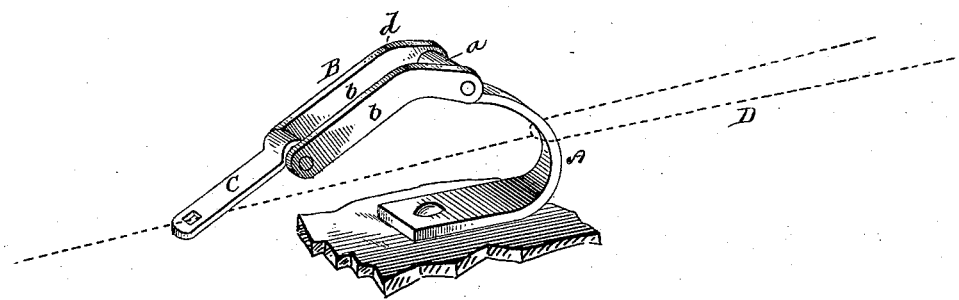
Figure 2:
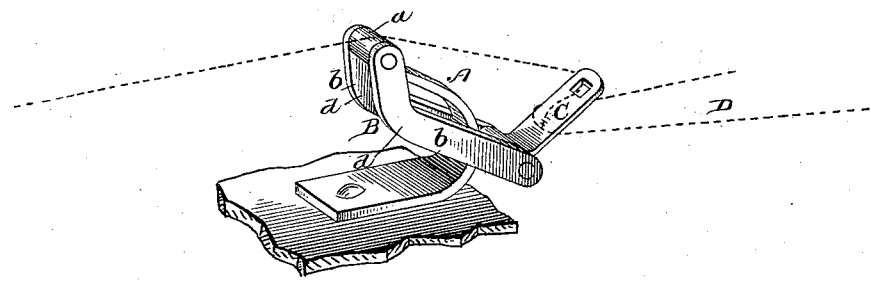
Figure 3:
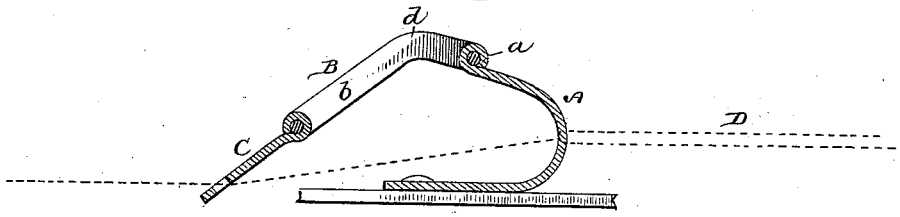

In the drawings, Figure 1 is a perspective view of our improvement. Fig. 2 is a perspective view showing the check-rein unhooked. Fig. 3 is a longitudinal vertical section of Fig. 1.

In the accompanying drawings, in which like letters of reference indicate corresponding parts in all the figures, A represents the check-rein hook, which is designed to be attached to the gig-saddle of a harness in any usual well-known manner. The said hook may be of any suitable or well-known construction; and pivoted to the upper free end, $a$, of the same is an arm or lever, B. This arm or lever B is preferably constructed of two metal plates, $b$, which are connected at their forward ends by a pin which passes through the end $a$ of the hook, and serves as the pivot-connection between the hook and lever. The said plates are slightly curved near their upper ends, as at $d$, so as to form a seat for the check-rein when it is detached or removed from the check-rein hook. The lower or free ends of the plates $b$ are connected by a pin, and upon said pin is journaled a loop, C, having an opening or eye, said loop being preferably of leather.

D represents the check-rein, to the rear end of which is attached a cord, which cord passes through the eye or opening in the loop C, and passes to the vehicle within easy reach of the driver.

The operation is as follows: When it is desired to uncheck the horse, the cord $f$ is pulled, which draws the check-rein rearwardly beyond the end $a$ of the hook. The horse, in attempting to drink, will draw the check-rein forwardly, which will cause it to strike against the pivoted lever, and upon the cord being loosened the horse can readily drink. When it is desired to check the horse, the cord is pulled, which draws the lever rearwardly into the position shown in Fig. 1, and the movement of the horse will draw the rein into engagement with the hook.

Having thus described our invention, what we claim as new, and desire to secure by Letters Patent, is—

1. The combination of a hook, a bent lever pivoted in the upper end of the hook above the plane of the check-rein, and adapted to be turned backward thereby, a loop pivoted to the forward end of the lever, and a cord connected directly with the check-rein and passing through the pivoted loop, as set forth.

2. The combination, with the hook, of the pivoted lever, a leather loop pivoted to the end thereof, and a cord connected with the check-rein hook and passing through said loop and extending to the vehicle, as set forth.

3. The combination, with the hook, of an arm or lever pivoted to the end thereof, and consisting of two plates, a pin connecting the plates at one end, a loop on said pin, said loop having an opening, and a cord attached to the check-rein and passing through said opening and extending to the rear of the same, as set forth.

In testimony that we claim the foregoing as our own we have hereto affixed our signatures in presence of two witnesses.

HENRY H. HOBART.
EDWIN T. COOMBES.

Witnesses:
E. G. SIGGERS,
WM. N. MOORE.